US005197045A

United States Patent [19]

Miyazawa

[11] Patent Number: 5,197,045

[45] **Date of Patent: * Mar. 23, 1993**

[54] ELECTRONIC WATCH

[75] Inventor: Osamu Miyazawa, Nagano, Japan

[73] Assignee: Seiko Epson Corporation, Tokyo, Japan

[ * ] Notice: The portion of the term of this patent subsequent to Dec. 5, 2006 has been disclaimed.

[21] Appl. No.: 353,294

[22] Filed: May 17, 1989

Related U.S. Application Data

[63] Continuation-in-part of Ser. No. 114,315, Oct. 28, 1987, Pat. No. 4,885,730.

[30] Foreign Application Priority Data

May 19, 1988 [JP] Japan ................................ 63-122582

[51] Int. Cl.[5] ........................ G04C 30/00; H02K 49/19

[52] U.S. Cl. ...................................... 368/157; 368/160

[58] Field of Search ............... 368/160, 149, 157, 168, 368/163, 175

[56] References Cited

U.S. PATENT DOCUMENTS

| | | | |
|---|---|---|---|
| 3,242,663 | 3/1966 | Castile | 368/149 |
| 3,571,711 | 3/1971 | Nemetz | 368/149 |
| 3,961,213 | 6/1976 | Kioke et al. | 368/168 |
| 3,978,654 | 9/1976 | Koike et al. | 368/168 |

FOREIGN PATENT DOCUMENTS

| | | |
|---|---|---|
| 940722 | 3/1956 | Fed. Rep. of Germany . |
| 112362 | 4/1979 | Japan . |
| 63-109389 | 5/1988 | Japan . |
| 595981 | 7/1977 | Switzerland . |
| 890349 | 2/1962 | United Kingdom . |
| 1441210 | 6/1976 | United Kingdom . |

*Primary Examiner*—Bernard Roskoski

*Attorney, Agent, or Firm*—Blum Kaplan

[57] ABSTRACT

A timepiece includes an accumulator such as a hairspring for storing the energy provided by a step motor and a control mechanism such as a rotor immersed in a viscous fluid for controlling the energy released by the accumulator to provide a constant driving force for turning the display hands of the timepiece. The accumulator and control mechanism are constructed along a common axis and are displaced from a spindle about which the display hands rotate. The spindle is positioned substantially at the center of the watch.

18 Claims, 6 Drawing Sheets

FIG. 3
PRIOR ART
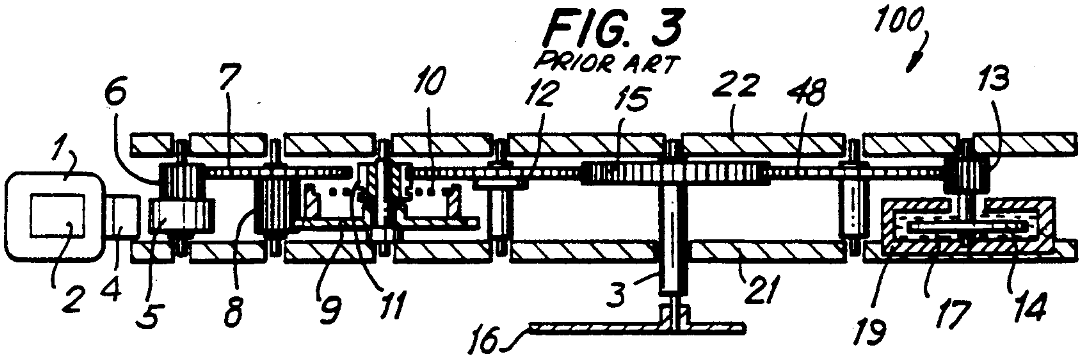
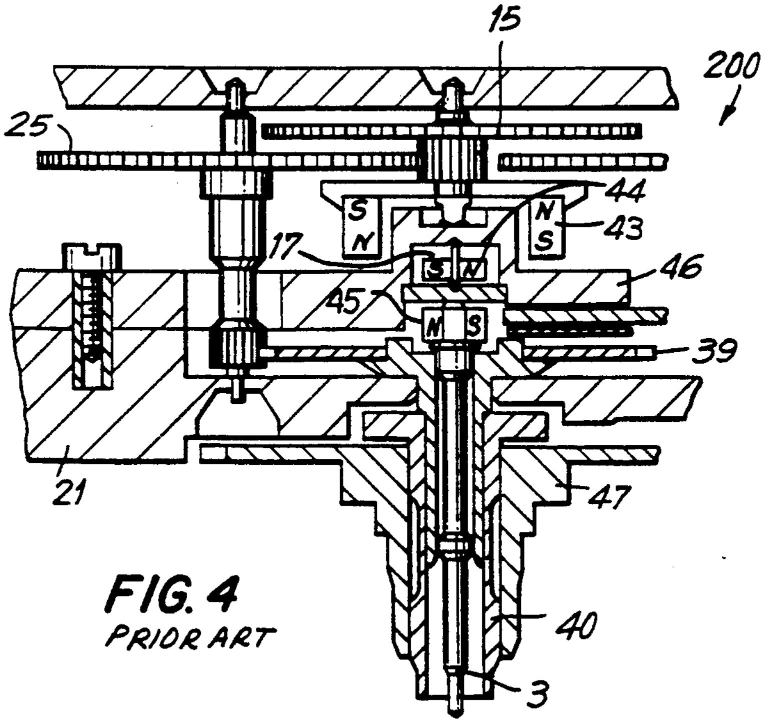
FIG. 4
PRIOR ART

ELECTRONIC WATCH

CROSS-REFERENCE TO RELATED APPLICATION

This application is a continuation-in-part of U.S. patent appilcation Ser. No. 114,315, filed Oct. 28, 1987, which issued as U.S. Pat. No. 4,885,730 on Dec. 5, 1989.

BACKGROUND OF THE INVENTION

This invention relates to a timepiece, and more particularly to the wheel-train structure of an electronic watch having a second hand.

A conventional electronic watch 100, which is disclosed in Japanese Patent Application No. 147940/1987, is illustrated in FIG. 3. Watch 100 includes a step motor having a coil 1, a magnetic core 2, a stator 4 and a rotor 5. A hairspring 10, which serves as the accumulator for rotational energy produced by the step motor, stores the rotational energy based on its elastic deformation. A control mechanism includes a viscous rotor 14 which is immersed in a viscous fluid 17 and which produces a load torque applied to a wheel train mechanism.

Coil 1 of the step motor generates a magnetic field for driving rotor 5 through magnetic core 2 and stator 4. Rotor 5 is coupled to a hair wheel 9 through a sixth pinion 6, a fifth gear 7 and a fifth pinion 8. Rotation of rotor 5 drives hair wheel 9. Hairspring 10 is connected to hair wheel 9 and a hairspring pinion 11. As hair wheel 9 intermittently rotates, an angular deviation between hair wheel 9 and hairspring pinion 11 is created due to the elastic deformation of hairspring 10. As hairspring 10 begins to recoil, producing a restoring (recoil) torque, hairspring pinion 11 begins to rotate. A second hand 16 is coupled to hairspring pinion 11 through a fourth idler 12 and fourth wheel 15. Rotation of hairspring pinion 11 causes second hand 16 to rotate. Viscous rotor 14 is coupled to fourth wheel 15 through a viscous rotor idler 48 and a rotor spindle 13.

As viscous rotor 14 rotates, a load torque proportional to the angular velocity of viscous rotor 14 is produced based on the viscous friction between viscous rotor 14 and viscous fluid 17. The load torque serves to regulate (i.e. control) any change in the rate of speed at which second hand 16 rotates. More particularly, as the recoil torque stored in hairspring 10 increases based on the difference in rotational frequency between hair wheel 9 and hairspring pinion 11, the rotational frequency of hairspring pinion 11 increases until it reaches a constant speed of rotation. Since the load torque of viscous rotor 14 changes in proportion to its angular velocity, the restoring torque retained by hairspring 10 as it increases results in increasing the angular velocity of viscous rotor 14. An increase in the viscous load of viscous rotor 14 results which opposes any increase in the angular velocity of viscous rotor 14. Since viscous rotor 14 is coupled through the gear train to hairspring pinion 11, any increase in the angular velocity of hairspring pinion 11 is also opposed. Similarly, when the torque retained in hairspring 10 decreases, any decrease in the angular velocity of hairspring pinion 11 is opposed by the viscous load of viscous rotor 14. Consequently, the speed at which second hand 16 rotates is maintained at a substantially constant level.

Fourth wheel 15 is coupled to second hand 16 through a second hand spindle 3. The wheel train mechanism is supported between a base plate 21 and a wheel train 22. Viscous rotor 14 is disposed within a cavity 19 which is integrally connected to base plate 21.

Another type of conventional electronic watch 200, which is disclosed in Japanese Patent Publication No. 47512/1981, is illustrated in FIG. 4. Watch 200 is driven by a quartz oscillator. Intermittent rotational energy is accumulated through magnetic attraction between a driving magnet 43 and a driven magnet 44. Driving magnet 43 is coupled to fourth wheel 15. Driven magnet 44 is immersed in viscous fluid 17. Rotation of driven magnet 44 in viscous fluid 17 transforms the intermittent rotational movement of driving magnet 43 into a relatively constant, uninterrupted rotational force. Driven magnet 44 magnetically interlocks with a follower magnet 45. A relatively constant, smooth rotation of second hand spindle 3, which is coupled to follower magnet 45, results.

Miniaturization of watches 100 and 200 are each limited by their construction. More particularly, since the accumulator and control mechanism of watch 100 are separated from each other a gear train mechanism including intermediate wheels 12 and 48 are required for linking the accumulator to the control mechanism. A relatively large area unsuitable for miniaturization results. Watch 200 requires the superposition of an hour hand spindle 47 on a minute hand spindle 40 for mounting the hour hand and minute hand, respectively. Fourth wheel 15 is coupled to a second wheel 39 through a third wheel 25. A second wheel train receiver 46 is also required for supporting and retaining driving magnet 43, driven 44 and follower (linkage) magnet 45. The construction of watch 200 makes it difficult to decrease its overall thickness and therefore is also unsuitable for miniaturization.

Accordingly, it is desirable to provide a timepiece having a second hand sweep-driven movement in which the wheel train structure is suitable for miniaturization and, in particular, to provide a timepiece having a second hand sweep-driven movement which is much thinner relative to conventional electronic watches.

SUMMARY OF THE INVENTION

Generally speaking, in accordance with the invention, a timepiece includes a motor for producing a mechanical driving force, a storage device for storing energy associated with the mechanical driving force and for producing a driving torque based on the stored energy, and a control mechanism for producing a load torque and for controlling the production of the driving torque at a relatively constant level based on the load torque. Rotation of an hour hand, minute hand and second hand is based on the driving torque produced by the storage device. The storage device and control mechanism are disposed along a common axis and are separated from a spindle about which the hour hand, minute hand and second hand rotate. The spindle is positioned substantially at the center of the watch.

The coaxial construction of the storage device and control mechanism away from the center of the watch body permits a reduction in the number of components within the watch resulting in both a decrease in size and manufacturing cost of the watch. The decrease in the number of components required within the watch also facilitates production of a thinner watch.

In one preferred embodiment of the invention, the storage device includes a hairspring. Alternatively, the storage device includes at least two magnets positioned relative to each other to create a magnetic field therebetween. The magnets face each other and can be disposed relative to each other in either a radial direction or an axial direction.

The control mechanism can include a rotor immersed in a viscous fluid. Alternatively, a velocity adjusting unit such as an electromagnetic brake or an escapement can serve as the control mechanism.

Accordingly, it is an object of the invention to provide an improved timepiece which can be miniaturized.

It is another object of the invention to provide an improved timepiece which is thinner than a conventional electronic watch.

It is a further object of the invention to provide an improved timepiece which includes less components and in which the accumulator and control mechanism are coaxially constructed.

Still other objects and advantages of the invention will in part be obvious and will in part be apparent from the specification.

The invention accordingly comprises an article of manufacture possessing the features, properties and the relation of elements which will be exemplified in the article hereinafter described and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a sectional view of an electronic watch in accordance with one embodiment of the prior art;

FIG. 4 is a sectional view of an electronic watch in accordance with an alternative embodiment of the prior art;

DETAILED DESCRIPTION OF THE PREFERRED EMBODIMENTS

Figure 1:
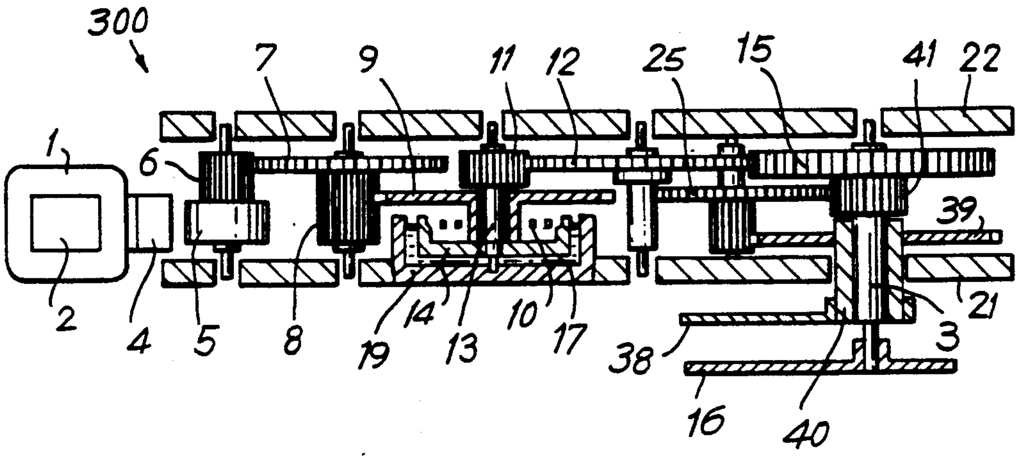
FIG. 1 is a sectional view of an electronic watch in accordance with one embodiment of the invention.

Those elements in FIGS. 1, 2, 5, 6 and 10–12 which operate and are constructed in the same manner as described in connection with FIG. 3 are represented by like reference numerals.

Figure 12:
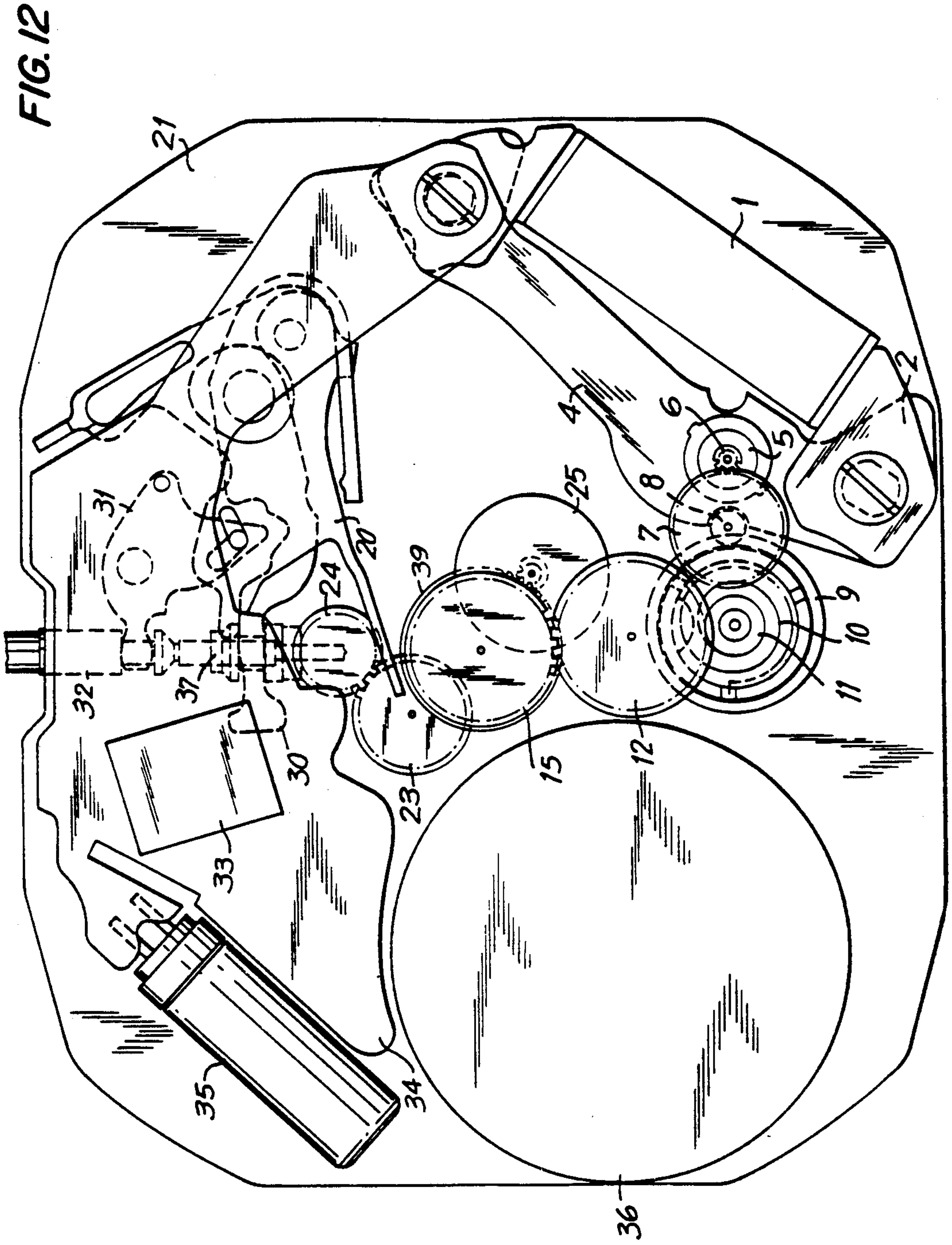
FIG. 12 is a plan view of the electronic watch of FIG. 1.

FIG. 1 illustrates a electronic watch 300 in accordance with a first embodiment of the invention. FIG. 12 is a plan view of watch 300 illustrating the wheel train unit in greater detail. A hairspring 10 serves as the accumulator for rotational energy produced by the step motor represented by coil 1, magnetic core 2, stator 4 and rotor 5. Hairspring 10 stores the rotational energy of the step motor based on its elastic deformation. Hairspring 10 is connected between hair wheel 9 and viscous rotor 14.

The control mechanism for controlling the rotational velocity of viscous rotor 14 is provided by the viscous resistance of viscous fluid 17 applied to viscous rotor 14. Viscous rotor 14 and viscous fluid 17 are disposed within cavity 19 which is mounted on base plate 21.

The step motor which serves as the actuator produces intermittent rotational energy based on the magnetic field produced by coil 1 driving rotor 5 through magnetic core 2 and stator 4. Rotor 5 is coupled to hair wheel 9 through sixth pinion 6, fifth wheel 7 and fifth pinion 8. Hair pinion 11 is coupled to idler 12 through fourth wheel 15. Hair pinion 11 and viscous rotor 14 are both fixed to viscous spindle 13. Hair wheel 9 is rotatable about viscous spindle 13. Fourth wheel 15 is coupled to a fourth pinion 41 which is integrally connected to second hand spindle 3 which in turn is connected to second hand 16. Accordingly, rotary motion of hair pinion 11 is coupled to second hand 16.

Fourth pinion 41 also drives a minute hand 38 through third wheel 25, a second wheel 39 and a minute hand spindle 40. Minute hand 38 is connected to minute hand spindle 40. Minute hand spindle 40 is also disposed at the center of base plate 21 and thereby serves as a central spindle for watch 300. The foregoing wheel train mechanism is retained between base plate 21 and wheel trail receiver 22.

As shown in FIG. 12, a minute wheel 23 drives an hour hand (not shown). Adjustments to the hour hand and minute hand 38 are made by operating a winding stem 32, which when pulled out causes a small iron wheel 24 to mesh with a sliding pinion 37 by action with a setting lever 31 and a gate bar 30. In particular, a second setting lever 20 readjusts one of the wheels of the wheel gear train and substantially simultaneously comes into contact with a reset part of a circuit board (substrate) 34. The positioning of second setting lever 20 is based on a setting lever 31 engaging a groove of winding stem 32. An integrated circuit (I.C.) 33 includes a timer circuit. Watch 300 also includes a quartz oscillator 35. I.C. 33, circuit board 34 and quartz oscillator 35 provide an oscillating signal to coil 1 for producing a driving signal for rotating rotor 5 of the step motor. Power is supplied by a battery 36.

Watch 300 translates the intermittent driving force of rotor 5 into potential energy stored in hairspring 10. The potential energy is released as a continuous rotational force which is coupled to second hand 16, minute hand 38 and an hour hand (not shown) through a gear train mechanism. Viscous fluid 17 provides a load torque which serves to control the release of the potential energy stored in hairspring 10. Consequently, the speed at which second hand 16, minute hand 38 and the hour hand rotate is maintained at a substantially constant level. The sweeping motion of each of these hands about the face of watch 300 is smooth and continuous.

The accumulator for storing the potential energy (i.e. hairspring 10, hair wheel 9 and viscous rotor 14) and the control mechanism (i.e. viscous rotor 14 immersed in viscous fluid 17) share a common axis of rotation and are offset from the central spindle (i.e. second hand spindle 3) of watch 300. Such construction permits miniaturization of watch 300 and facilitates manufacture of a relatively thin watch compared to conventional electronic watches.

Figure 2:
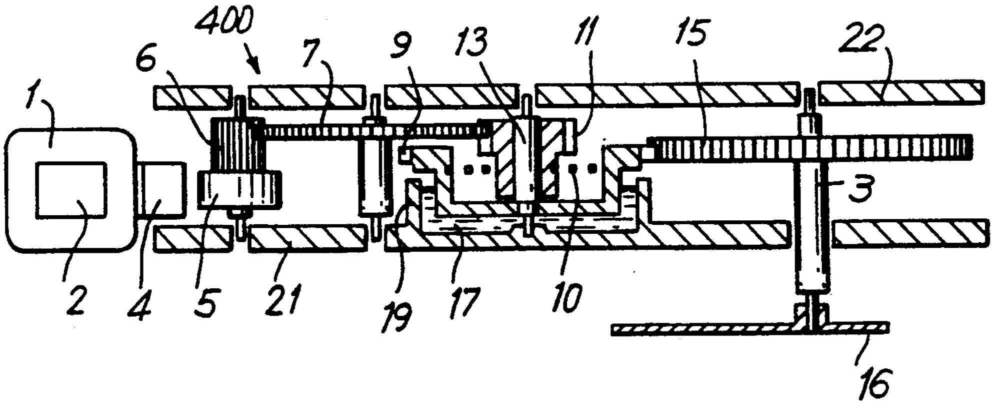
FIG. 2 is a sectional view of an electronic watch in accordance with an alternative embodiment of the invention.

An electronic watch 400 in accordance with a second embodiment of the invention is shown in FIG. 2. Fifth wheel is coupled to hair pinion 11 Viscous fluid 17 is contained between cavity 19 and hair wheel 9. Cavity 19 is integrally connected to base plate 21. The frictional resistance of viscous fluid 17 applied to hair wheel 9 compensates for an intermittent motion by rotor 5 resulting in a constant, smooth rotary motion of hair wheel 19. Second hand 16 is coupled to fourth wheel 15 through second hand spindle 3. Hair pinion 11 is rotatable about viscous spindle 13. Hairspring 10 is connected between hair wheel 9 and hair pinion 11. Hair wheel 9 serves as the viscous rotor resulting in a watch of less elements and simpler construction manufactured at a lower production cost.

Figure 5:
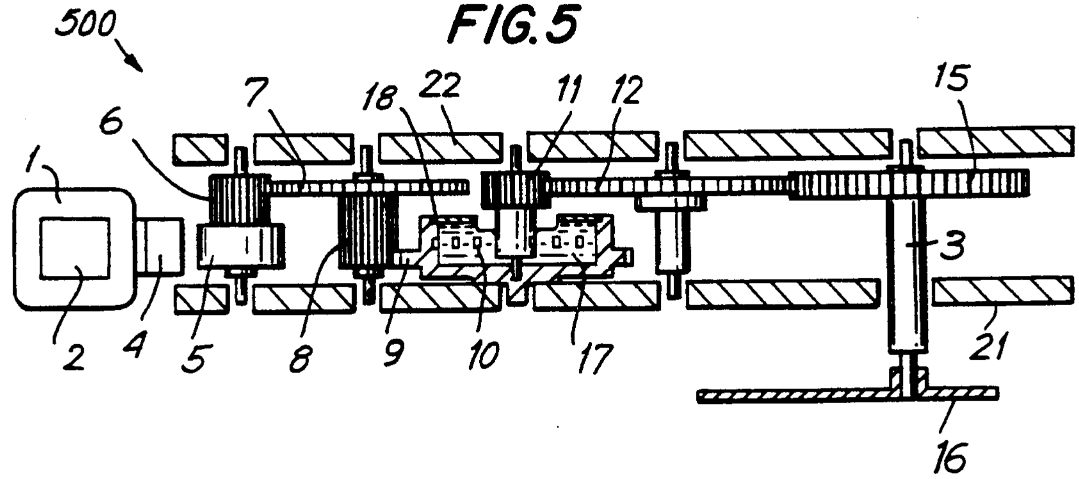
FIG. 5 is a sectional view of an electronic watch in accordance with another alternative embodiment of the invention.

An electronic watch 500 in accordance with a third embodiment of the invention is shown in FIG. 5. Hairspring 10 is connected between hair wheel 9 and hair pinion 11 and extends inwardly from the interior surface of hair pinion 9. Hair wheel 9 and hair pinion 11 are substantially concentric. Viscous fluid 17 is contained within the interior walls of hair wheel 9 and is sealed by a cap 18. Viscous fluid 17 is substantially stagnant within the gap defined by the interior surface of hair wheel 9, hair pinion 11 and cap 18 by dint of the surface tension. The intermittent energy of rotor 5 is communicated to hair pinion 11 through hair wheel 9 and hairspring 10. Deformation of hairspring 10 is regulated by the viscous resistance of viscous fluid 17. The intermittent energy of rotor 5 is transformed into a gradual deformation of hairspring 10 resulting in hair pinion 11 rotating continuously. The power required by the step motor to continuously rotate hair pinion 11 can be reduced since there is no loss of energy produced by the step motor created by the viscous load between base plate 21 and the step motor.

Figure 6:
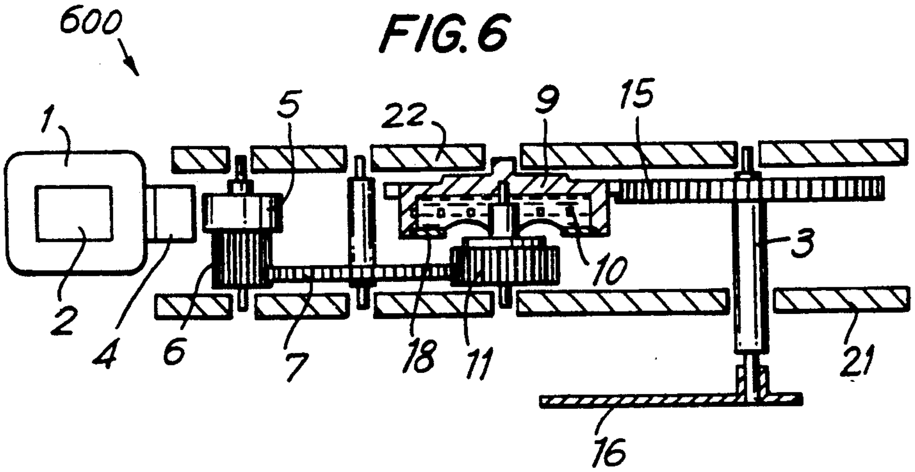
FIG. 6 is a sectional view of an electronic watch in accordance with still another alternative embodiment of the invention.

An electronic watch 600 in accordance with a fourth embodiment of the invention is shown in FIG. 6. Fifth wheel 7 intermittently rotates hair pinion 11. Similar to watch 500, hairspring 10 is immersed in viscous fluid 17 and is connected between hair wheel 9 and hair pinion 11. Viscous fluid 17 is sealed within the interior of hair wheel 9 by cap 18. Intermittent rotary movement of hair pinion 11 results in a smooth and continuous rotary motion of hair wheel 9. The moment of inertia of hair pinion 11 (i.e. the intermittently movable member) is reduced resulting in a further reduction in the level of power consumption required by watch 600 compared to conventional electronic watches.

Figure 9:
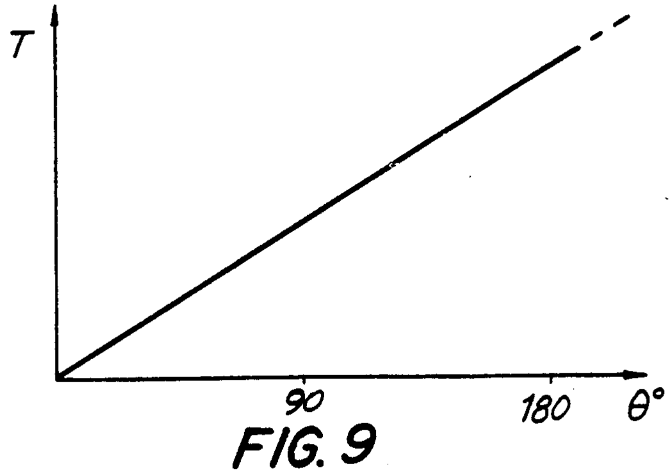
FIG. 9 illustrates the restoring torque characteristics of a hairspring.

FIG. 9 graphically illustrates the restoring torque (T) characteristics based on winding angles Θ of hairspring 10. As winding angle Θ increases based on the angular deviation between hair pinion 11 and hair wheel 9, restoring torque T of hairspring 10 increases approximately proportionately. In other words, a substantially linear relationship between restoring torque T and winding angle Θ exists. Since the viscous load associated with viscous fluid 17 is proportional to the rotational velocity of the element immersed within viscous fluid 17, the viscous load is substantially equal to restoring torque T.

Figure 7:
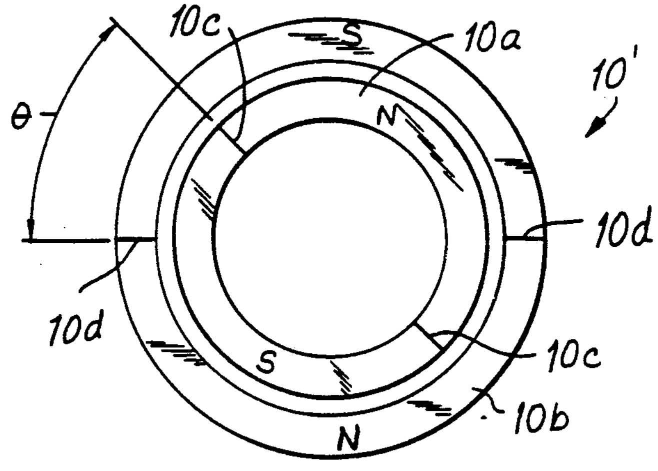
FIG. 7 diagrammatically illustrates a magnetic type accumulator.

FIG. 7 illustrates another type of accumulator 10′ which can be incorporated in an electronic watch in accordance with the invention. More particularly, accumulator 10′ stores the rotational energy produced by rotor 5 in a magnetic field created by the magnetic attraction or repulsion of a driving magnet **10*a* and a driven magnet 10*b*. Driving magnet 10*a* includes a pair of magnetizing boundaries 10*c* between the north (N) and south (S) poles. Similarly, driven magnet 10*b* includes a pair of magnetizing boundaries 10*d*** between its N and S poles.

Figure 8:
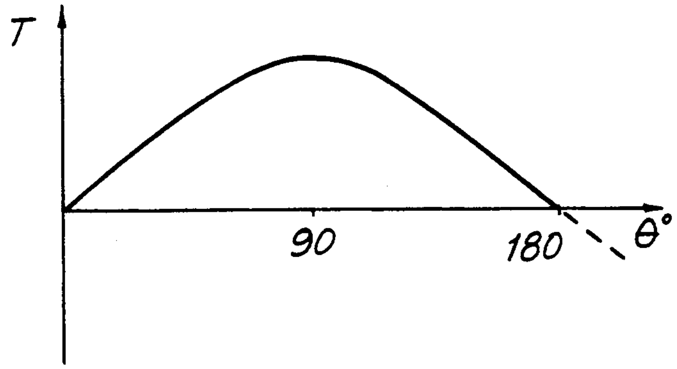
FIG. 8 illustrates the restoring torque characteristics of the magnetic type accumulator.

As illustrated in FIG. 8, the restoring torque T characteristics of accumulator 10′ vary in the form of a sine wave. Accumulator mechanism 10′ provides the same effective accumulation of rotational energy produced by rotor 5 when winding angle Θ between driving magnet **10*a* and driven magnet 10*b*** does not exceed 180°.

Figure 10:
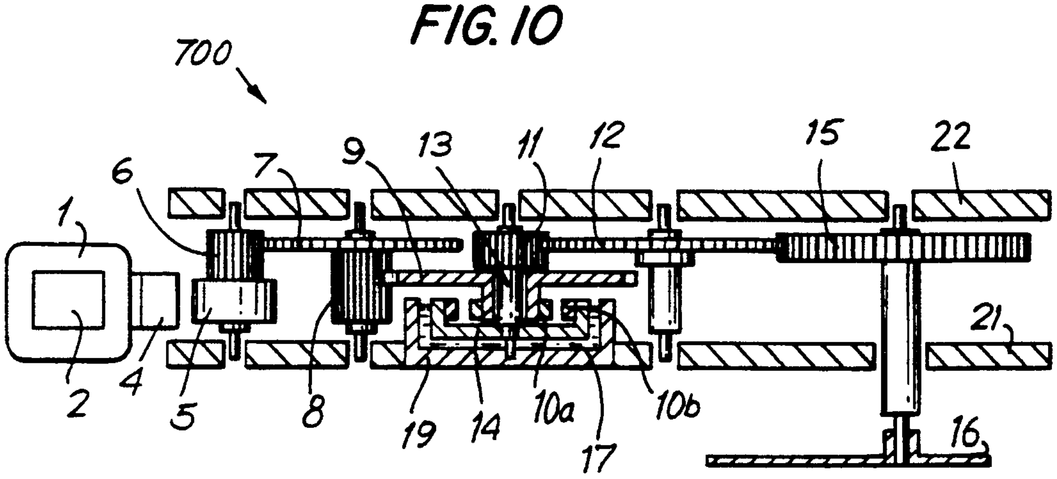
FIG. 10 is a sectional view of an electronic watch in accordance with yet another alternative embodiment of the invention.

An electronic watch 700 in accordance with a fifth embodiment of the invention is shown in FIG. 10. Driving magnet **10*a* and driven magnet 10*b* store the rotational energy of rotor 5. Construction and operation of watch 700 is substantially the same as watch 300 of FIG. 1 except that driving magnet 10*a* and driven magnet 10*b* serve as the accumulator rather than hairspring 10. Driving magnet 10*a* is connected to hair wheel 9 and driven magnet 10*b* is connected to viscous rotor 14. Handling of the easily deformable hairspring 10 is avoided through use of driving magnet 10*a* and driven magnet 10*b*. Assembly of driving magnet 10*a* to hairspring 9 and driven magnet 10*b* to viscous rotor 14 is carried out with the magnets in their non-magnetizing states. Once assembled, magnetization of magnets 10*a* and 10*b*** can be effected, for example, by applying a magnetic field to the magnets.

Figure 11:
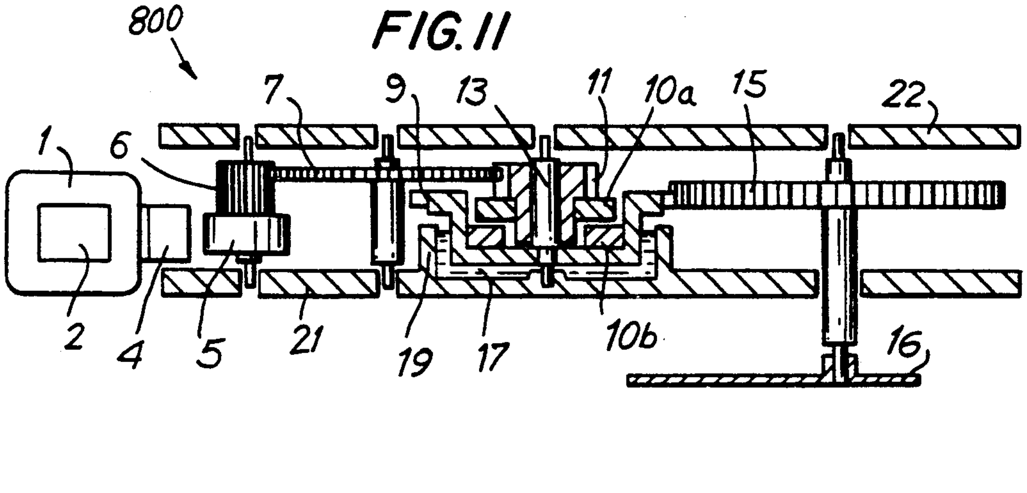
FIG. 11 is a sectional view of an electronic watch in accordance with a further alternative embodiment of the invention.

An electronic watch 800 in accordance with a sixth embodiment of the invention is shown in FIG. 11. Rather than positioning driving magnet **10*a* and driven magnet 10*b* in a radial direction as provided by watch 700, driving magnet 10*a* and driven magnet 10*b* of watch 800 are disposed in an axial direction relative to viscous spindle 13. Construction and operation of watch 800 is otherwise substantially similar to watch 700 of FIG. 10. The axial arrangement of driving magnet 10*a* and driven magnet 10*b* prevents leakage of magnetic flux because the size of two magnets can be equalized, thereby equalizing both the total amount of the magnetic flux to each other. Accordingly any adverse influence on the step motor due to leakage of magnetic flux from driving magnet 10*a* and driven magnet 10*b*** is prevented.

As now can be readily appreciated, the various embodiments of the invention provide for the coaxial construction of the accumulator and the control mechanism for controlling the release of the energy stored by the accumulator. The invention is not limited to the embodiments disclosed above. For example, the actuator can include a piezoelectric element which provides reciprocating motion or an ultrasonic motor. Similarly, the control mechanism is not limited to use of viscous fluid 17 and can include, but is not limited to, a velocity adjusting unit such as an electromagnetic brake or an escapement. Positioning of the coaxially constructed accumulator and control mechanism away from the center of the watch body permits a reduction in the number of components within the watch resulting in both a decrease in size and manufacturing cost of the watch. The decrease in the number of components required within the watch also facilitates production of a thinner watch.

It will thus be seen that the objects set forth and those made apparent from the preceding description are efficiently attained and, since certain changes may be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

What is claimed is:

1. A timepiece comprising:

motor means for producing a mechanical driving force;

storage means for storing energy associated with said mechanical driving force and for producing a driving torque based on said stored energy;

control means for producing a load torque and for controlling the production of said driving torque at a relatively constant level based on said load torque, said control means including a rotor immersed in viscous fluid;

indicator means for rotatingly indicting the time based on said driving torque, said indicator means having a first spindle about which said indicators means rotates; and a second spindle means operatively coupling said storage means anc said rotor of said control means for common rotation, said storage means and said rotor of said control means having a common axis and being spaced along the length of said second spindle means, said second spindle means being laterally offset from said first spindle.

2. The timepiece of claim 1, wherein said storage means includes a hairspring.

3. The timepiece of claim 1, wherein said storage means includes at least two magnets positioned relative to each other to create a magnetic field therebetween.

4. The timepiece of claim 3, wherein said magnets face each other.

5. The timepiece of claim 4, wherein said magnets are disposed relative to each other in a radial direction.

6. The timepiece of claim 2, wherein said storage means includes at least two magnets positioned relative to each other to create a magnetic field therebetween.

7. The timepiece of claim 6, wherein said magnets face each other.

8. The timepiece of claim 7, wherein said magnets are disposed relative to each other in a radial direction.

9. The timepiece of claim 7, wherein said magnets are disposed relative to each other in an axial direction.

10. The timepiece of claim 3, wherein one of said magnets is connected to said rotor.

11. The timepiece of claim 6, wherein one of said magnets is connected to said rotor.

12. The timepiece of claim 1, wherein the first spindle is positioned approximately at the center of the timepiece.

13. The timepiece of claim 2, wherein the first spindle is positioned approximately at the center of the timepiece.

14. The timepiece of claim 1, further including first gear train means for profiling said mechanical driving force to said storage means and second gear train means connected between said storage means and indicator means.

15. The timepiece of claim 14, wherein said storage means includes a hairspring.

16. The timepiece of claim 14, wherein the first spindle is positioned approximately at the center of the timepiece.

17. The timepiece of claim 15, wherein the first spindle is positioned approximately at the center of the timepiece.

18. The timepiece of claim 4, wherein said magnets are disposed relative to each other in an axial direction.

* * * * *